(12) United States Patent
Bowman

(10) Patent No.: US 8,142,855 B2
(45) Date of Patent: Mar. 27, 2012

(54) MICHAEL ADDITION CURING USING PHOSPHINE CATALYST

(75) Inventor: Mark P. Bowman, New Kensington, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 557 days.

(21) Appl. No.: 12/209,296

(22) Filed: Sep. 12, 2008

(65) Prior Publication Data

US 2010/0068393 A1    Mar. 18, 2010

(51) Int. Cl.
*B05D 3/02* (2006.01)

(52) U.S. Cl. ............ 427/384; 427/331; 427/372.2; 427/421.1; 427/426; 525/74; 525/78; 525/286; 525/308; 525/471

(58) Field of Classification Search .......... 427/331, 427/372.2, 384, 385.5, 421.1, 426; 525/8, 525/10, 11, 74, 77, 78, 79, 80, 286, 302, 525/303, 304, 309, 471
See application file for complete search history.

(56) References Cited

U.S. PATENT DOCUMENTS

| 2,675,372 | A |   | 4/1954  | Coover, Jr. |
| 3,027,359 | A |   | 3/1962  | Jurgeleit |
| 3,729,404 | A | * | 4/1973  | Morgan ............... 522/18 |
| 4,343,885 | A | * | 8/1982  | Reardon, Jr. ......... 430/270.1 |
| 5,084,536 | A |   | 1/1992  | Brindöpke |
| 5,169,979 | A |   | 12/1992 | Kubillus |
| 5,496,896 | A |   | 3/1996  | Alfons |
| 5,713,519 | A | * | 2/1998  | Sandison et al. ....... 239/8 |
| 6,495,653 | B1 | * | 12/2002 | Kinsho ............... 528/73 |
| 6,635,736 | B2 |   | 10/2003 | Van Dijk |
| 2006/0094804 | A1 |   | 5/2006 | Lachowicz |

FOREIGN PATENT DOCUMENTS

| EP | 1 321 494 A1 |   | 6/2003 |
| EP | 1 371 689 A1 |   | 12/2003 |
| EP | 1371689 A1 | * | 12/2003 |
| EP | 1 593 728 A2 |   | 11/2005 |
| WO | WO 2005/012394 A2 |   | 2/2005 |

OTHER PUBLICATIONS

Gimbert, Carolina et al.,"Michael additions catalyzed by phosphines. An overlooked synthetic method.", www.sciencedirect.com, Jul. 20, 2005.
Walling, Cheves et al., "Some Radical Reactions of Trivalent Phosphorus Derivatives with Mercaptans, Peroxides, and Olefins. A New Radical Cyclization", Department of Chemistry, Columbia University, Jan. 8, 1964; New York, New York 10027.

* cited by examiner

*Primary Examiner* — Michael Cleveland
*Assistant Examiner* — Alexander Weddle
(74) *Attorney, Agent, or Firm* — William J. Uhl

(57) ABSTRACT

A method of applying a curable composition to a substrate is disclosed. The composition comprises a polyene and a active hydrogen-containing compound that are capable of undergoing a Michael Addition reaction. The reaction is conducted in the presence of a tertiary phosphine catalyst. The components of the composition are sprayed in separate streams whereby the streams overlap prior to contacting the substrate and the composition cures quickly on the substrate.

9 Claims, No Drawings

MICHAEL ADDITION CURING USING PHOSPHINE CATALYST

FIELD OF THE INVENTION

The present invention relates to the use of phosphines as catalysts for the Michael addition of active hydrogen containing materials to polyenes.

BACKGROUND OF THE INVENTION

The Michael addition reaction is well known as a curing mechanism for decorative and protective coatings. Typically, the reaction is catalyzed by strong base such as primary or secondary amines that cause yellowing and can also reduce the hydrolytic stability of coatings formulated with polymers that have linkages susceptible to hydrolysis such as polyesters.

Tertiary phosphines are known to catalyze Michael addition reactions. However, they are used under conditions where curing is through exposure to UV light or under conditions with extended pot lives and/or curing at elevated temperatures. See for example U.S. Pat. No. 3,729,484; 5,084,536; 5,496,896 and 2006/0094804.

For certain applications is would be desirable to catalyze Michael addition reactions with tertiary phosphines where cure occurs rapidly, that is within a few seconds after a coating containing the Michael addition reactants are applied to a substrate. For example, in the coating of large vertically disposed substrates such as bridges or buildings it would be desirable to apply the coating composition and have it cure immediately at ambient temperature.

SUMMARY OF THE INVENTION

The present invention provides a method for applying to a substrate a curable composition comprising:
A. a polyene,
B. an active hydrogen containing compound,
C. a tertiary phosphine
wherein A and B are capable of Michael addition reaction in the presence of the tertiary phosphine; the method comprising spraying the curable composition in separate streams wherein the components A, B, and C are drawn from two or more separate containers to form the separate streams. The streams overlap prior to contacting the substrate and the composition is cured on the substrate.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Not with standing that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is also meant to include copolymer and oligomer.

Acrylic and methacrylic are designated as (meth)acrylic.

Aliphatic and cycloaliphatic are designated as (cyclo)aliphatic.

Suitable polyenes for use in the present invention are numerous and can vary widely. Such polyenes can include those that are known in the art. Non-limiting examples of suitable polyenes can include those that are represented by the formula:

A-(X)

wherein A is an organic moiety, m is an integer of at least 2, and X is an olefinically unsaturated moiety and m is at least 2, typically 2 to 4. Examples of X are groups of the following structure:

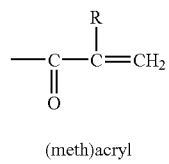

(meth)acryl wherein each R is a radical selected from H and methyl.

The polyenes (Michael acceptors) are compounds or polymers having in the molecule olefinic double bonds that are reactive with active hydrogen-containing compounds. Examples of such materials are (meth)acrylic-functional (meth)acrylic copolymers, epoxy resin(meth)acrylates, polyester(meth)acrylates, polyether(meth)acrylates, polyurethane(meth)acrylates, amino(meth)acrylates, silicone(meth)acrylates, and melamine(meth)acrylates. The number average molar mass (Mn) of these compounds is preferably around 200 to 10,000. The molecule preferably contains on average 2 to 20 olefinic double bonds that are polymerizable by exposure to radiation. (Cyclo)aliphatic(meth)acrylates in each case are preferably used. (Cyclo)aliphatic polyurethane (meth)acrylates and (cyclo)aliphatic polyester(meth)acrylates are particularly preferred. The binders may be used singly or in mixture.

Specific examples of polyurethane(meth)acrylates are reaction products of the polyisocyanates such as 1,6-hexamethylene diisocyanate and/or isophorone diisocyanate including isocyanurate and biuret derivatives thereof with hydroxyalkyl(meth)acrylates such as hydroxyethyl(meth)acrylate and/or hydroxypropyl(meth)acrylate. The polyisocyanate can be reacted with the hydroxyalkyl(meth)acrylate in a 1:1 equivalent ratio or can be reacted with and NCO/OH equivalent ration greater than 1 to form an NCO-containing reaction product that can then be chain extended with a polyol such as a diol or triol, for example 1,4-butane diol, 1,6-hexane diol and/or trimethylol propane. Examples of polyester(meth) acrylates are the reaction products of (meth)acrylic acid or anhydride with polyols, such as diols, triols and tetraols, including alkylated polyols, such as propoxylated diols and triols. Examples of polyols include 1,4-butane diol, 1,6-hexane diol, neopentyl glycol, trimethylol propane, pentaerythritol and propoxylated 1,6-hexane diol. Specific examples of polyester(meth)acrylate are glycerol tri(meth)acrylate, trimethylolpropane tri(meth)acrylate, pentaerythritol tri(meth) acrylate and pentaerythritol tetra(meth)acrylate.

By active hydrogen containing compound (Michael donor) is meant (a) compounds containing at least two

groups are located in the alpha position with respect to electron withdrawing groups such as methylene groups having two (2) carbonyl groups in the alpha position; and (b) polythiol compounds.

Examples of compound (a) are acetoacetate and malonate materials such as polyesters of malonic acid and polyesters of acetoacetic acid which are formed from reacting the malonic acid or the acetoacetic acid with polyols.

Examples of polyols that are suitable for the esterification of the malonic and acetoacetic acid are those having from 1 to 20 carbon atoms such as ethylene glycol, glycerol and trimethylol propane. Specific polyesters are ethanediol, bisacetoacetate, glycerol trismalonate and trimethylolpropane triacetate.

As used herein the term "polythiol functional material" refers to polyfunctional materials containing two or more thiol functional groups (SH). Suitable polythiol functional materials for use in forming the radiation curable topcoat composition are numerous and can vary widely. Such polythiol functional materials can include those that are known in the art. Non-limiting examples of suitable polythiol functional materials can include, but are not limited to, polythiols having at least two thiol groups including compounds and polymers. The polythiol can have ether linkages (—O—), sulfide linkages (—S—), including polysulfide linkages (—S$_x$—), wherein x is at least 2, such as from 2 to 4, and combinations of such linkages.

The polythiols for use in the present invention include, but are not limited to, materials of the formula:

wherein $R_1$ is a polyvalent organic moiety and n is an integer of at least 2, typically 2 to 6.

Non-limiting examples of suitable polythiols include, but are not limited to, esters of thiol-containing acids of the formula HS—$R_2$—COOH wherein $R_2$ is an organic moiety with polyhydroxy compounds of the structure $R_3$—(OH)$_n$ wherein $R_3$ is an organic moiety and n is at least 2, typically 2 to 6. These components can be reacted under suitable conditions to give polythiols having the general structure:

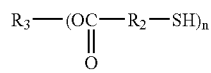

wherein $R_2$, $R_3$ and n are as defined above.

Examples of thiol-containing acids are thioglycolic acid (HS—CH$_2$COOH), α-mercaptopropionic acid(HS—CH (CH$_3$)—COOH) and β-mercaptopropionic acid(HS—CH$_2$CH$_2$COCH) with polyhydroxy compounds such as glycols, triols, tetraols, pentaols, hexaols, and mixtures thereof. Other non-limiting examples of suitable polythiols include, but are not limited to, ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis(thioglycolate) and pentaerythritol tetrakis(β-mercaptopropionate), and mixtures thereof.

Typically, the polyene is present in the clear topcoat composition in amounts of 80 to 98, more typically 90 to 95 percent by weight, and the polythiol material is typically present in amounts of 2 to 20, more usually 5 to 10 percent by weight. The percentages by weight are based on total weight of polyene and polythiol.

The phosphine catalyst is a tertiary phosphine that may be (cyclo)aliphatic, aromatic or mixed (cyclo)aliphatic aromatic, (cyclo)alkyl, aryl, alkaryl, and acalkyl. The phosphine is of the structure

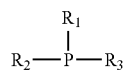

where $R_1$, $R_2$ and $R_3$ are each independently selected from (cyclo)aliphatic and aromatic groups containing from one to twelve carbon atoms such as (cyclo)alkyl and (cyclo)alkyl groups and aromatic groups containing 6-12 carbons such as aryl and aryl(cycloalkul).

Suitable examples include tributylphosphine, triisobutylphosphine, tri-tertiary-butylphosphine, trioctyl phosphine, tris(2,4,4-trimethylpentyl)phosphine, tricyclopentylphosphine, tricyclohexalphosphine, tri-n-octylphosphine, tri-n-dodecylphosphine, triphenyl phosphine, and dimethyl phenyl phosphine.

The equivalent ratio of a Michael receptor to the Michael donor is from 4:1 to 1:4, preferably 1.5:1 to 1:1.5. The phosphine catalyst is present in amounts of 0.1 to 5, preferably 0.2 to 2 percent by weight based on weight of Michael acceptor and Michael donor.

The curable compositions may be water borne or solvent borne or it can be diluent-free compositions. The compositions may contain additives that are commonly used in protective and decorative coatings such as pigments, ultra-violet absorbers, hindered amine stabilizers, adhesion promoters, and flow additives.

The curable compositions are in the form of multi-packaged systems where the polyene, active hydrogen containing compound and tertiary phosphine are in separate packages prior to application to the substrate. Alternatively, the composition can be in two (2) packages with the polyene and the active hydrogen containing compound being present in one package and the tertiary phosphine being present in the second package. Alternatively, the polyene and the tertiary phosphine can be present in one package and the active hydrogen compound present in the second package or the active hydrogen containing compound and the tertiary phosphine can be present in one package and the polyene present in a separate package. The additives can be present in any of the packages.

Because of rapid curing times, the compositions are typically applied to a substrate by spraying via a nozzle assembly using an external spraying apparatus. Whereby the components of the composition are drawn in separate streams from their respective packages or containers whereby the streams intermingle and mix prior to contacting the substrates and the composition cures immediately on the substrate, Typically, intermingling and mixing of the streams occur after they leave the external spraying device but before being applied to the substrate using a multi-nozzle spraying apparatus. For example, two adjacent atomizing nozzles are positioned so that separate streams are atomized and expelled from the spraying apparatus as separate atomized streams. Atomization occurs by applying pressurized air to the nozzles. The nozzles are positioned so that the separate atomized streams overlap prior to reaching the substrate. A typical spraying apparatus is as described in U.S. Pat. No. 5,713,519. The application and curing occurs at ambient conditions, typically 15-30° C.

EXAMPLES

The following examples are intended to illustrate the invention, and should not be construed as limiting the invention in any way. All parts and percentages are by weight unless otherwise indicated.

Example A

Polyene

Urethane acrylate, (NCO—Free)

A urethane acrylate was prepared by stirring a room temperature mixture of isophorone diisocyanate, DESMODUR Z 4470 from Bayer Material Science (1895 grams), a free radical inhibitor, Ionol (2.67 grams), dibutyltin dilaurate (5.35 grams), and triphenyl phosphite (9.8 grams) under nitrogen. Then, 2-hydroxyethyl acrylate (581.8 grams) was added drop wise over the course of 20 minutes while maintaining the reaction temperature at 62° C. Then, 1,4-butanediol (25 grams) was added dropwise over 20 minutes, with the reaction temperature maintained at 60° C. The reaction mixture was stirred for an additional 30 minutes at 60° C. Finally, butyl acetate was added (403.3 grams), and the mixture briefly stirred.

Example B

Urethane Acrylate (NCO—containing)

A urethane acrylate was prepared by stirring a room temperature mixture of 1,6-hexamethylene diisocyanate, DESMODUR N 3600 from Bayer Material Science (515.3 grams), a free radical inhibitor, hydroquinone monomethyl ether (0.28 grams), dibutyltin dilaurate (0.25 grams), and butyl acetate (140.8 grams) under nitrogen. Then, 4-hydroxybutyl acrylate (284.2 grams) was added drop wise over the course of 60 minutes while maintaining the reaction temperature at 70° C. Butyl acetate was added (59.2 grams), and the mixture was then maintained at 60-65° C. for two hours. The reaction product had NCO equivalent of The reaction product had NCO equivalent weight of 884 based on weight of resin solids.

Example C

Hydroxy-Containing Acrylic Polymer

A mixture of n-amyl propionate (178.25 grams) and triphenyl phosphite (1.46 grams) was heated under nitrogen to reflux (157-158° C.). Then a mixture of 2-ethylhexyl acrylate (176.92 grams), hydroxyethyl methacrylate (336.98 grams), isobornyl methacrylate (98.57 grams), acrylic acid (12.64 grams), styrene (217.35 grams), tert-dodecyl mercaptan (4.19 grams), n-amyl propionate (49.63 grams) and LUPEROX DTA (29.38 grams, [Di-t-amyl peroxide, available from Arkema Inc.]) was added drop wise over four hours while holding the reaction mixture at reflux temperatures (169-175° C.). An additional 11.38 grams of n-amyl propionate was added and a mixture of LUPEROX DTA (4.12 grams) and n-amyl propionate (5.37 grams) was added over 30 minutes while maintaining the reaction mixture at 175° C. An additional 11.38 grams of n-amyl propionate was added and the reaction was refluxed (173° C.) for an additional hour. The product was then cooled under a nitrogen atmosphere and had the following properties:

GPC [in THF, polystyrene standards] (Mw 4471, Mn 1457, Mz 10017)
% Solids 77.85%
OH value 128.7
Acid value 7.54

Example D

Polyene

The acrylic resin of Example C (694.4 grams) was heated to 65° C. under nitrogen. Then urethane acrylate resin of Example B (470.8 grams) was added drop wise over one hour while maintaining a temperature of 60-65° C. Then, butyl acetate was added (136.4 grams) and the mixture was stirred at 65° C. for an additional two hours.

Example E

Polythiol

Pentaerythritol tetrakis(3-mercapto propionate)

Example 1

Primer Formulation

| Description | Formula Weight (grams) |
|---|---|
| Pack A | |
| Urethane acrylate of Example A | 104.77 |
| SR-9003 (Diacrylate) | 8.42 |
| Iron Oxide | 0.31 |
| Talc | 26.14 |
| Barium Sulfate | 7.61 |
| Calcium carbonate | 22.93 |
| Titanium dioxide | 2.60 |
| Acetone | 70.12 |

| Description | Formula Weight (grams) |
|---|---|
| Pack B | |
| Pentaerythritol tetrakis(3-mercaptopropionate) of Example E | 29.3 |

[1]Propoxylated neopentyl glycol diacrylate available from Sartomer, Inc.

The above Pack A and Pack B were mixed together and placed in one container. A 10% by weight solution of trioctyl phosphine in butyl acetate was placed in a second container. The formulation was sprayed onto cold rolled steel panels in separate streams drawn from the two separate containers. Spraying was done with a Binks Model 2001 GW gun that is available from ITW Industrial Finishing, Glendale Heights, Ill. The spray gun is a lightweight, hand-held, plural component spray gun for spraying two-component materials. The spray gun is operated in the conventional manner. The trigger action starts, and stops, the spray of both materials simultaneously. The two materials exit separately as an atomized spray from their respective nozzles and impinge on each other approximately 6" in front of the gun (resin) nozzle. Here, the resulting turbulence insures intimate mixing.

| Cure Time (dry to touch) | Amount of Pack A + B | 10% Trioctyl phosphine solution |
|---|---|---|
| Less than 15 seconds | 53.8 grams | 11.5 grams |
| Less than 15 seconds | 51.9 grams | 2.82 grams |

Example 2

Clearcoat Formulation

| Description | Formula Weight (grams) |
|---|---|
| Pack A | |
| Byk 300[1] | 0.5 |
| Amyl propionate | 19.0 |
| Methyl isobutyl ketone | 23.0 |
| Urethane acrylate of Example D | 73.1 |
| SR-9003 (diacrylate) | 15.0 |
| Pack B | |
| Pentaerythritol tetrakis(3-mercaptopropionate) of Example E | 27.2 |

[1]Polysiloxane flow control agent available from BYK Chemical.

The above Pack A and Pack B were mixed together and placed in one container. A 10% by weight solution of dimethyl phenyl phosphine in butyl acetate was placed in a second container. The formulation was sprayed onto cold rolled steel panels using a Binks Model 2001 GW spray gun, as described in Example 1. The clear coat was dry to the touch in less than 15 seconds.

Example 3

Clearcoat Formulation

| Description | Formula Weight (grams) |
|---|---|
| Pack A | |
| Byk 300 | 0.5 |
| Amyl propionate | 19.0 |
| Methyl isobutyl ketone | 23.0 |
| Urethane acrylate acrylic I | 128.6 |
| SR-9003 (diacrylate) | 20.0 |
| Pack B | |
| Pentaerythritol tetrakis(3-mercaptopropionate) | 27.3 |

The above Pack A and Pack B were combined, a catalyst solution added as shown in the table below. The mixture was stirred and then drawn down with a 2-mil draw down bar onto a steel panel or placed in a 20 ml scintillation vial. Tack-free tine is recorded.

| Pack A | Pack B grams | Catalyst | Catalyst amount | Observations |
|---|---|---|---|---|
| 10 grams | 2.1 | Dimethylphenyl phosphine | 0.6 | vial gelled within 1 minute, drawdown took 7 minutes to be tack free |
| 10 grams | 2.1 | Methyldiphenyl phosphine | 0.06 | takes 3 drops (0.06 g) to gel clear |
| 10 grams | 2.1 | Methyldiphenyl phosphine | 0.4 | bulk gelled within ½ minute, drawdown tack free in 1 minute |
| 10 grams | 0.0 | Methyldiphenyl phosphine | 0.4 | Did not gel. [No thiol] |

Example 4

Acetoacetate as Michael Donor

A mixture of Setalux 17-7202 (10.0 grams, an acetoacetate functional acrylic resin, available from Nuplex Industries Ltd., Auckland, New Zealand and propoxylated trimethylolpropane triacrylate (0.69 grams, SR-492 available from Sartomer Inc., Exton, Pa.) were treated with 0.5 grams of either trioctyl phosphine or triethylamine.

No Catalyst—No change in viscosity
Triethylamine—No change in viscosity after 4 hours
Trioctyl phosphine—Gel within 10 minutes

Example 5

Clearcoat Formulation

| Description | Formula Weight (grams) |
|---|---|
| Pack A | |
| Byk 300 | 0.5 |
| Amyl propionate | 19.0 |
| Methyl isobutyl ketone | 23.0 |
| Urethane acrylate acrylic of Example D | 128.6 |
| SR-9003 (diacrylate) | 20.0 |
| Pack B | |
| Pentaerythritol tetrakis(3-mercaptopropionate) of Example E | 27.3 |

The above Pack A & B were mixed together and placed in one container. A 10% solution of trioctyl phosphine in butyl acetate was placed in a second container. The formulation was sprayed onto cold rolled steel panels using a Binks Model 2001 GW spray gun as described in Example 1. The clear coat dried to the touch in less than 15 seconds.

What is claimed is:

1. A method of applying to a substrate a curable composition comprising:
   A. a polyene,
   B. a polythiol,
   C. a tertiary phosphine
wherein A and B undergo Michael addition reaction in the presence of the tertiary phosphine; the method comprising spraying the curable composition in separate streams wherein the components A, B, and C are drawn from two or more separate containers to form the separate streams whereby the streams overlap prior to contacting the substrate and curing the composition on the substrate.

2. The method of claim 1 in which the separate streams are separately atomized.

3. The method of claim 2 in which the separate streams are expelled from a spray gun as separate atomized streams through a nozzle assembly.

4. The method of claim 3 in which pressurized air is applied to the nozzle assembly.

5. The method of claim 4 in which the nozzle assembly comprises a plurality of adjacent nozzles positioned so that the separate atomized streams intermingle and mix prior to reaching the substrate.

6. The method of claim 1 in which the polyene is of the structure $A\text{-}(x)_m$ where A is an organic moiety, m is at least 2 and x is a group of the structure

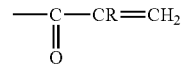

where R is H or methyl.

7. The method of claim 1 in which the phosphine is of the structure

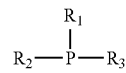

where $R_1$, $R_2$, and $R_3$ are each independently selected from the group consisting of (cyclo)alkyl, alkaryl and aralkyl.

8. The method of claim 7 in which $R_1$, $R_2$, and $R_3$ are each independently selected from alkyl having from 1 to 12 carbon atoms and aryl having 6 to 12 carbon atoms.

9. The method of claim 1 in which (C) is present in the composition in amounts of 0.1 to 5% by weight based on weight of (A) and (B).

* * * * *